United States Patent
Akutsu et al.

(10) Patent No.: US 9,570,960 B2
(45) Date of Patent: Feb. 14, 2017

(54) DRIVING-DEVICE-INTEGRAL-TYPE ROTARY ELECTRIC MACHINE

(75) Inventors: Satoru Akutsu, Chiyoda-ku (JP); Yoshihito Asao, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 262 days.

(21) Appl. No.: 14/353,253

(22) PCT Filed: Jan. 25, 2012

(86) PCT No.: PCT/JP2012/051490
§ 371 (c)(1),
(2), (4) Date: Apr. 21, 2014

(87) PCT Pub. No.: WO2013/111277
PCT Pub. Date: Aug. 1, 2013

(65) Prior Publication Data
US 2015/0303776 A1    Oct. 22, 2015

(51) Int. Cl.
*H02K 11/00*    (2016.01)
*H02K 5/04*    (2006.01)
*H02K 9/22*    (2006.01)
*H02M 7/493*    (2007.01)
*H02K 3/28*    (2006.01)

(52) U.S. Cl.
CPC ............. *H02K 11/0073* (2013.01); *H02K 5/04* (2013.01); *H02K 9/22* (2013.01); *H02K 11/33* (2016.01); *H02K 3/28* (2013.01); *H02M 7/493* (2013.01)

(58) Field of Classification Search
CPC ...... H02K 7/065; H02K 11/0073; H02K 5/04; H02K 3/28; H02K 11/046

USPC ........................................... 310/68 D, 52, 54
See application file for complete search history.

(56) References Cited

U.S. PATENT DOCUMENTS

| | | |
|---|---|---|
| 2011/0254387 A1 | 10/2011 | Matsuda et al. |
| 2011/0254837 A1 | 10/2011 | Kang et al. |
| 2011/0285225 A1 | 11/2011 | Matsuda et al. |
| | (Continued) | |

FOREIGN PATENT DOCUMENTS

| | | |
|---|---|---|
| CN | 102223121 A | 10/2011 |
| CN | 102248963 A | 11/2011 |
| | (Continued) | |

OTHER PUBLICATIONS

International Search Report, mailed Apr. 24, 2012, PCT/JP2012/051490.
(Continued)

*Primary Examiner* — Hanh Nguyen
(74) *Attorney, Agent, or Firm* — Sughrue Mion, PLLC; Richard C. Turner

(57) ABSTRACT

A driving-device-integral-type rotary electric machine includes a driving device 8 having a first inverter 27a and a second inverter 27b, which can supply power to stator windings 5a and 5b of the rotary electric machine 2, and the first inverter 27a and the second inverter 27b are arranged and installed in a heat sink 19, in a state where the inverters are linearly symmetrical with respect to an axis X of the rotary electric machine 2, and the heat sink is configured in such a way that at least a heat capacity of a portion with respect to the first inverter 27a is roughly equal to a heat capacity of a portion with respect to the second inverter 27b.

8 Claims, 3 Drawing Sheets

(56) References Cited

U.S. PATENT DOCUMENTS

| | | | |
|---|---|---|---|
| 2012/0161689 A1* | 6/2012 | Yamasaki | B62D 5/0406 318/724 |
| 2012/0299407 A1 | 11/2012 | Miyama et al. | |
| 2012/0319542 A1* | 12/2012 | Hazeyama | B60L 11/1803 310/68 D |
| 2013/0257191 A1* | 10/2013 | Abe | H02K 9/00 310/52 |
| 2013/0257192 A1* | 10/2013 | Tsuboi | H02K 11/33 310/52 |

FOREIGN PATENT DOCUMENTS

| | | | |
|---|---|---|---|
| JP | 2004-297847 A | 10/2004 | |
| JP | 4200885 B2 | 12/2008 | |
| JP | 2011-200022 A | 10/2011 | |
| JP | 2011-250489 A | 12/2011 | |
| WO | 2011/093200 A1 | 8/2011 | |

OTHER PUBLICATIONS

Communication dated Sep. 30, 2014 from the Japanese Patent Office in counterpart application No. 2013-555040.
International Search Report of PCT/JP2012/051490 dated Apr. 24, 2012.
Communication dated Apr. 25, 2016 from European Patent Office in counterpart Application No. 12866453.9.
Communication dated Jun. 12, 2016 from the State Intellectual Property Office of the P.R.C. in counterpart Application No. 201280056097.7.
Communication dated Oct. 28, 2015 from the State Intellectual Property Office of the People's Republic of China in counterpart application No. 201280056097.7.

\* cited by examiner

US 9,570,960 B2

DRIVING-DEVICE-INTEGRAL-TYPE ROTARY ELECTRIC MACHINE

CROSS REFERENCE TO RELATED APPLICATIONS

This is a National Stage of International Application No. PCT/JP2012/051490 filed Jan. 25, 2012, the content of all of which is incorporated herein by reference in its entirety.

BACKGROUND OF THE INVENTION

Technical Field

The present invention relates to a driving-device-integral-type rotary electric machine in which a rotary electric machine and a driving device, which drives the electric rotary machine by supplying power, are integrally fixed.

Background Art

In a conventional driving-device-integral-type rotary electric machine, a pair of three-phase inverters is provided in a driving device, and the three-phase inverters are unevenly distributed around an axis of the rotary electric machine so as to be arranged (for example, refer to Patent Document 1).

CONVENTIONAL ART DOCUMENT

Patent Document

Patent Document 1
  Japanese Patent Publication No 4200885

SUMMARY OF THE INVENTION

Problems to be Solved by the Invention

In the conventional driving-device-integral-type rotary electric machine described in Patent Document 1, there have been problems in that three-phase inverters are arranged in a state where the inverters are unevenly distributed with respect to a heat capacity of the rotary electric machine used as a radiator for radiating heat generated by the three-phase inverters, so that the heat capacity of the rotary electric machine used as the radiator is not effectively used. Moreover, there have been problems in that although the heat capacity of the rotary electric machine is high, only a low heating value is permitted toward a driving device, and a current capacity for energizing the rotary electric machine is increased, so that it is difficult that output power of the rotary electric machine is increased.

The present invention has been made to solve the above-described problems of the conventional driving-device-integral-type rotary electric machine, and an object of the invention is to provide a driving-device-integral-type rotary electric machine in which a current capacity for energizing the rotary electric machine is increased, and output power of the rotary electric machine can be increased.

Means for Solving Problems

A driving-device-integral-type rotary electric machine of the present invention includes a rotary electric machine, and a driving device for driving the rotary electric machine by supplying power, which are integrally fixed; wherein the driving device includes a first inverter and a second inverter, which can supply power to stator windings of the rotary electric machine, and the first inverter and the second inverter are installed and arranged in a heat sink, in a state where the inverters are linearly symmetrical with respect to an axis of the rotary electric machine, and the heat sink is configured in such a way that at least a heat capacity of a portion with respect to the first inverter is roughly equal to a heat capacity of a portion with respect to the second inverter.

Effects of the Invention

According to the driving-device-integral-type rotary electric machine of the present invention, heat radiation of the inverters is distributed, and a heat capacity of a heat sink, in which the inverters are mounted, is effectively utilized, whereby the driving-device-integral-type rotary electric machine, in which driving current is enhanced, and output power is improved, can be obtained.

DETAILED DESCRIPTION OF THE PREFERRED EMBODIMENTS

Embodiment 1

Figure 1:
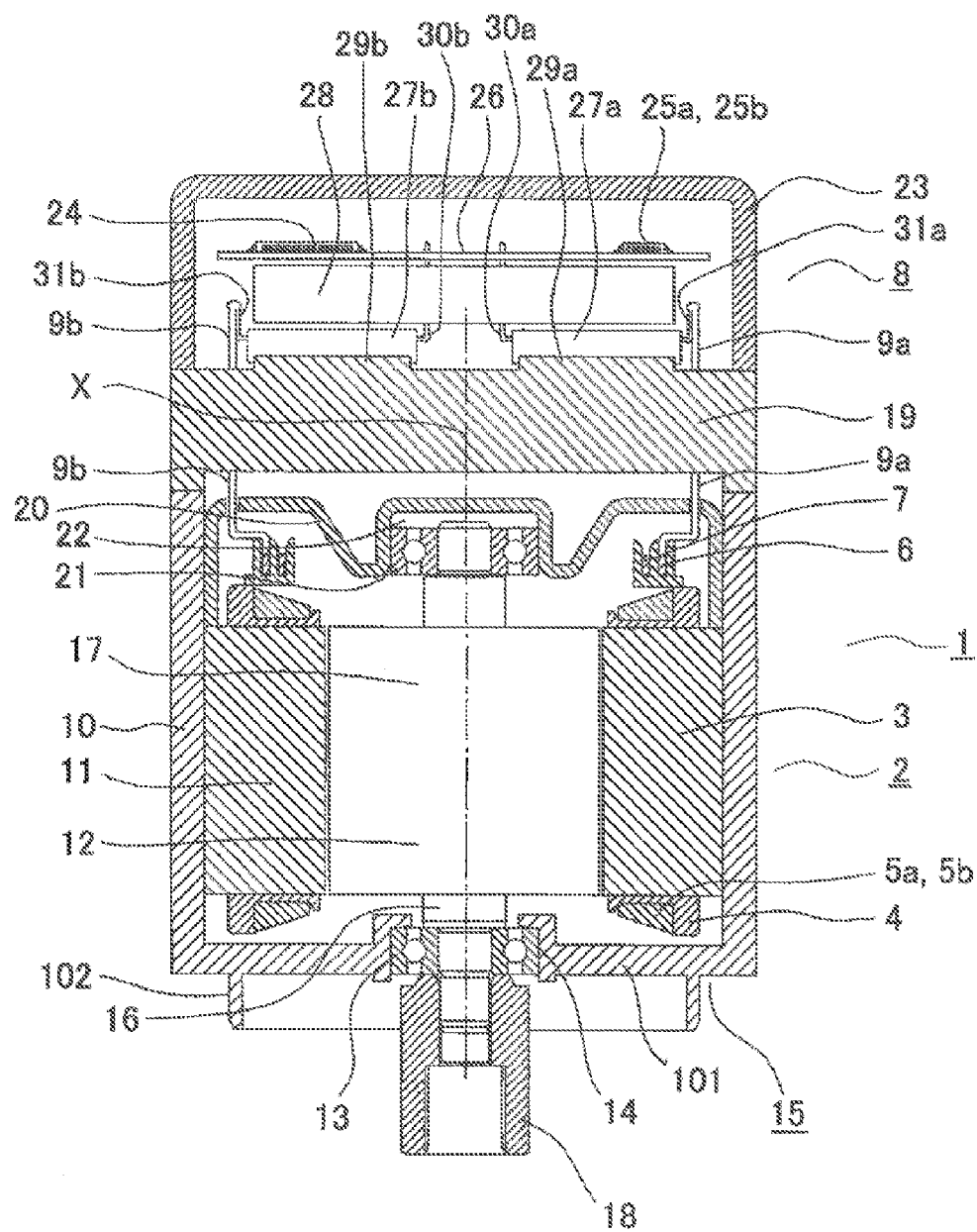
FIG. 1 is an axial-cross-sectional view illustrating a driving-device-coaxial-integral-type rotary electric machine according to Embodiment 1 of the present invention.
Figure 2:
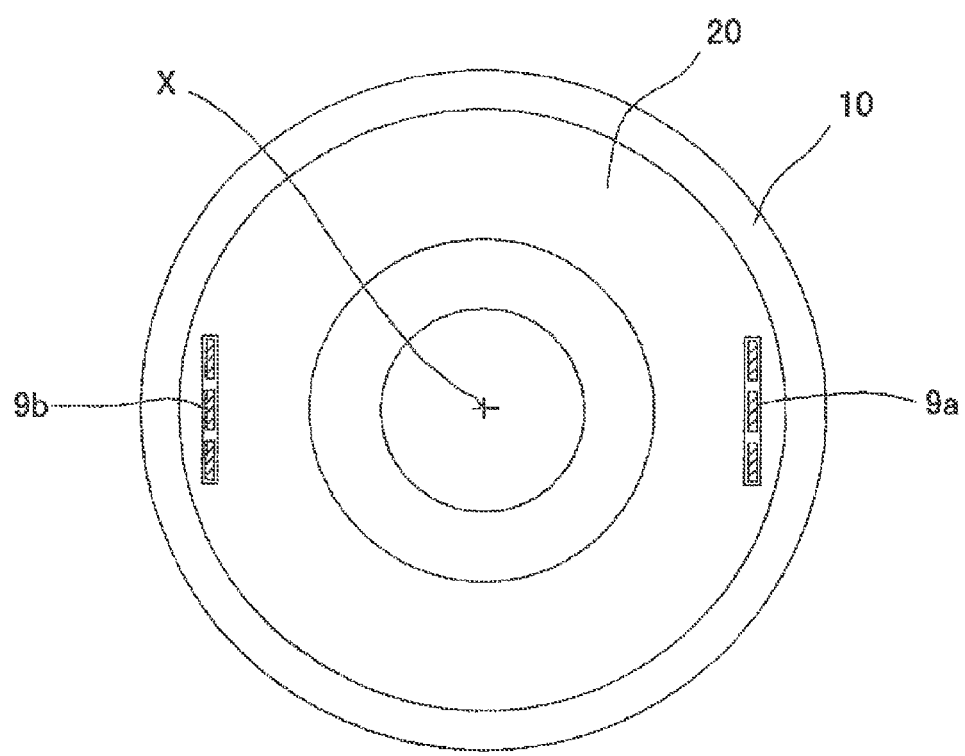
FIG. 2 is a plane view illustrating a connecting portion of the rotary electric machine and a driving device in the driving-device-coaxial-integral-type rotary electric machine according to Embodiment 1 of the present invention.

FIG. 1 is an axial-cross-sectional view illustrating a driving-device-coaxial-integral-type rotary electric machine according to Embodiment 1 of the present invention. FIG. 2 is a plane view illustrating a connecting portion of the rotary electric machine and a driving device in the driving-device-coaxial-integral-type rotary electric machine according to Embodiment 1 of the present invention. In FIG. 1 and FIG. 2, a rotary electric machine 2 of a driving-device-integral-type rotary electric machine 1 are formed as a brushless-type permanent magnet synchronous motor, and a first stator winding 5a and a second stator winding 5b, which are two pairs of three-phase stator windings, are wound around a stator core 3, which is formed by laminating electromagnetic steels, via an insulator 4 made from a resin. Each pair of the first stator winding 5a and the second stator winding formed as a delta connection by a winding terminal holder 7 installed in a terminal holder 6 made from a resin.

In addition, the above-described the first stator winding 5a and the second stator winding 5b may be formed as Y connections. Moreover, the stator windings may be formed as a pair of three-phase stator windings. However, a case, in which two pairs of three-phase stator windings—the first stator winding 5a and the second stator winding 5b—are provided, will be explained in the following description.

A first motor terminal 9a and a second motor terminal 9b, which are electrically connected to a driving device 8, are attached, in each of pairs of three-phase stator windings, to the winding terminal holder 7. The first motor terminal 9a and the second motor terminal 9b, for each of pairs of three-phase stator windings, are extended in an axis direction so as to be arranged at a position where the motor terminals are linearly symmetrical with respect to an extended axis "X" of the rotary electric machine 2. The stator core 3 is inserted to a frame 10 made from aluminum so as to be composed of a stator 11 of the rotary electric machine 2. A bottom 101 is provided at one end portion (front-side end portion). A front bearing box 14, in which a front bearing 13 for supporting one end portion of a rotor 12, is formed at a central portion of the bottom 101.

An inside-low portion 102 for being fitted to a reduction mechanism (not illustrated) used as the other mechanism is provided at the bottom 101 of the frame 10 so as to be composed of an attachment portion 15 with respect to the reduction mechanism. A permanent magnet 17 for generating a field flux is attached to an outer circumference of a shaft 16 of the rotor 12. Moreover, a boss 18 used as a coupling is attached to a front-side end portion of the shaft 16.

The end portion of the frame 10 is opened, and an aperture of the frame 10 is linked to one end portion of a heat sink 19 of the driving device 8. The heat sink 19 is formed by using a die casting made from an aluminum alloy, and the other end portion is connected to a cover 23 of the driving device 8. A rear holder 20 is inserted to the aperture of the frame 10, and a rear bearing box 22 for installing a rear bearing 20, by which on end portion of the rotor 12 is supported, is formed at a central portion of the rear bearing 20. The first motor terminal 9a and the second motor terminal 9b are extended in an axis direction so as to be arranged at a position where the motor terminals are linearly symmetrical with respect to the extended axis X of the rotary electric machine 2, and those penetrate the rear bearing 20 as suitably indicated in FIG. 2.

The driving device 8 includes a microcomputer 24, a control board 26 made from glass epoxy, on which a first FET-driving circuit 25a and a second FET-driving circuit 25b are mounted, and two pairs of inverters 27a and 27b, on which power elements, such as a power MOSFET and the like, for three-phases are mounted. Hereinafter, the inverter 27a is referred to as a first inverter, and the inverter 27b is referred to as a second inverter. A lead frame 28 is provided between the control board 26 and the first and second inverters 27a and 27b.

The lead frame 28 is integrally formed in such a way that a terminal (not illustrated) made from copper, by which power is supplied to the first inverter 27a and second inverter 27b, and a terminal (not illustrated) made from copper, by which the first inverter 27a and second inverter 27b are connected to a capacitor (not illustrated) and a coil (not illustrated), are inserted to a resin. Moreover, a terminal (not illustrated) made from copper, by which a connector (not illustrated) is connected to the control board 26, the first inverter 27a, and second inverter 27b, is integrally inserted to the lead frame 28 so as to be formed.

The first inverter 27a and the second inverter 27b are configured in such a way that the inverters are respectively contacted to a first protrusion 29a and a second protrusion 29b, which are formed on the heat sink 19, so as to be mounted, heat generated by the power element is transmitted to the heat sink 19. The first protrusion 29a and the second protrusion 29b are formed in such a way that the protrusions are extended in a direction where the axis X of the rotary electric machine 2 is extended. The first inverter 27a and the second inverter 27b are arranged at a position where the inverters are linearly symmetrical with respect to the axis X of the rotary electric machine 2.

Moreover, a first inverter-signal terminal 30a and a second inverter-signal terminal 30b as well as a first inverter-motor terminal 31a and a second inverter-motor terminal 31b are respectively provided in the first inverter 27a and the second inverter 27b. The first inverter-signal terminal 30a and the second inverter-signal terminal 30b are connected to the control board 26, and the first inverter-motor terminal 31a and the second inverter-motor terminal 31b are connected to the first motor terminal 9a and the second motor terminal 9b, which penetrate the heat sink 19 so as to be protruded.

Figure 3:
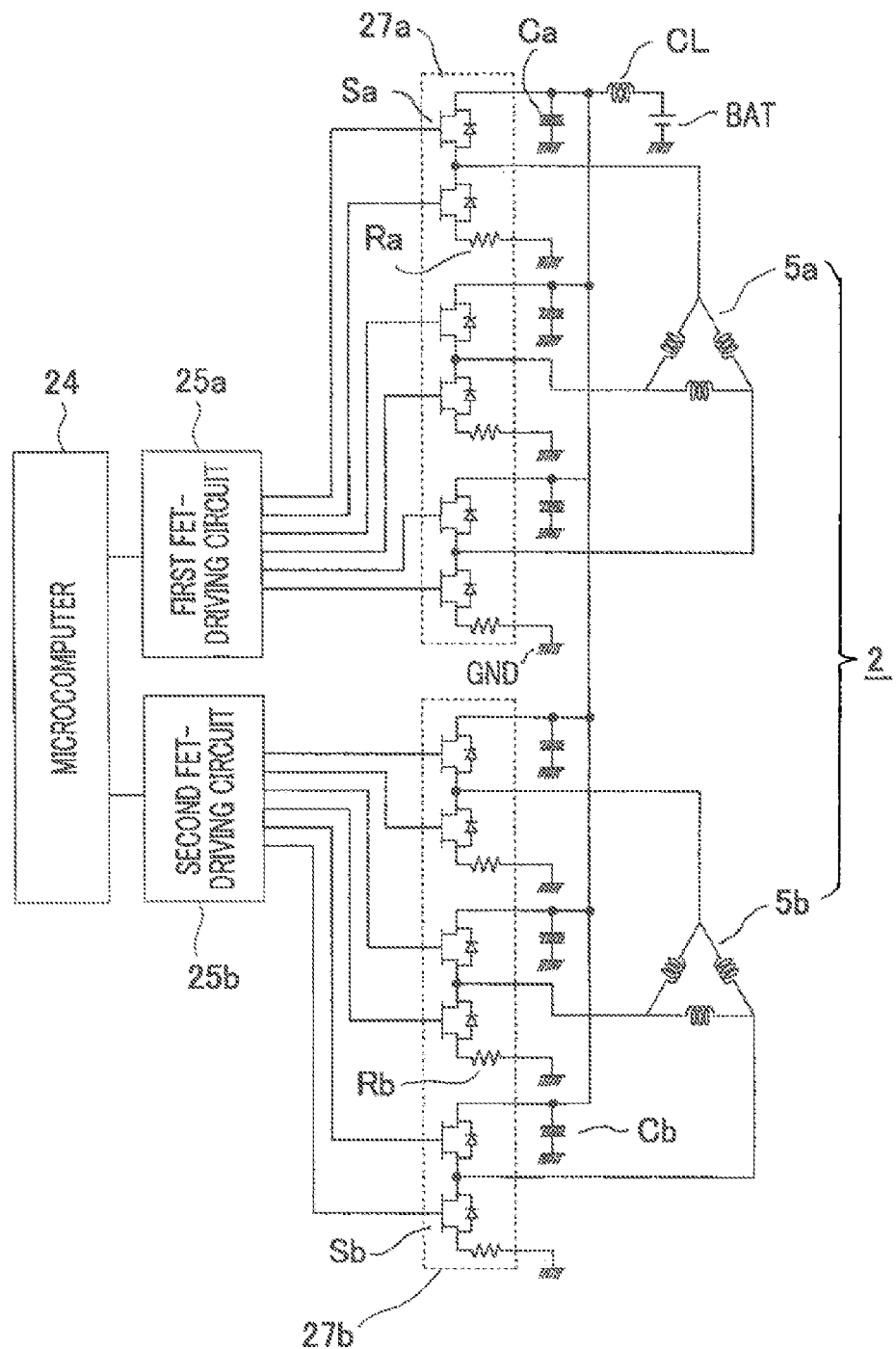
FIG. 3 is a circuit diagram of the driving-device-coaxial-integral-type rotary electric machine according to Embodiment 1 of the present invention.

FIG. 3 is a circuit diagram of the driving-device-coaxial-integral-type rotary electric machine according to Embodiment 1 of the present invention. In FIG. 3, the rotor 12 is the brushless-type permanent magnet synchronous motor as described above, and includes the first stator winding 5a and the second stator winding 5b, which are two pairs of three-phase stator windings formed as the delta connection. The first inverter 27a is composed of a first switching element Sa having six field-effect transistor (hereinafter, referred to as FET), three first shunt resistors Ra, and three first smoothing capacitors Ca. The second inverter 27b is composed of a second switching element Sb having six FET, three second shunt resistors Rb, and three second smoothing capacitors Cb.

Positive-pole-side terminals of the first inverter 27a and the second inverter 27b are commonly connected, via a choke coil CL, to a positive-pole side of a battery BAT used as a DC power supply, and negative-pole-side terminals of the inverters are connected to ground level GND via the shunt resistors Ra and the shunt resistors Rb. Moreover, AC-side output terminals of the first inverter 27a are connected to terminals of the first stator winding 5a so as to supply three-phase AC power to the first stator winding 5a, and AC-side output terminals of the second inverter 27b are connected to terminals of the second stator winding 5b so as to supply three-phase AC power to the second stator winding 5b.

The first FET-driving circuit 25a controls a control signal, which is supplied to each gate of the first switching element Sa of the first inverter 27a, in accordance with a command outputted from the microcomputer 24 so as to drive the first inverter 27a. The second FET-driving circuit 25b controls a control signal, which is supplied to each gate of the second switching element Sb of the second inverter 27b, in accordance with a command outputted from the microcomputer 24 so as to drive the second inverter 27b.

The rotor 12 of rotary electric machine 2 is rotated by energizing the first stator winding 5a and the second stator winding 5b or by energizing one of the stator windings.

In addition, when a pair of stator windings is provided, the first inverter 27a and the second inverter 27b are switched in accordance with a requirement so as to operate any of the inverters, whereby the stator winding can be driven, or the first inverter 27a and the second inverter 27b are concurrently operated, whereby the stator winding can be driven.

Hereinafter, a thermal-radiation operation for heat generated by the first inverter 27a and the second inverter 27b will be explained. In FIG. 1, the heat sink 19 is configured in such a way that heat capacities corresponding to volumes of portions, which are respectively corresponded to the first inverter 27a and the second inverter 27b and located immediately below the inverters, are roughly equivalent each other. Moreover, thermal-transmission passages, by which heat is transmitted from the first inverter 27a and the second inverter 27b to the frame 10 via the portions of the heat sink 19, which are respectively located immediately below the inverters, are roughly equivalent each other. Therefore, heat generated from the first inverter 27a and the second inverter 27b is roughly and equivalently spread and radiated.

Hereinafter, when a value of each driving current passed through the first inverter 27a and the second inverter 27b is defined as "Iw", and a value of current, which is permitted with respect to a heat capacity of the heat sink 19 and a radiation capacity toward the heat sink 19 and the frame 10 when only one of inverters is used, is defined as "Is", and an internal resistance of the first inverter 27a and the second inverter 27b is defined as "Ri", each of values is defined so as to roughly establish the following formula (1).

$$Iw^2 \times Ri \times 2 = Is^2 \times Ri \qquad \text{Formula (1)}$$

As a common knowledge, a value, which is obtained by multiplying a square of a current value to a resistance value, indicates a power loss, so that the Formula (1) represents that a power loss (=generated heat), which is generated when one of the first inverter 27a and the second inverter 27b is singly operated, is equal to a power loss (=generated heat), which is generated when the first inverter 27a and the second inverter 27b are concurrently operated. As described above, when one of the inverters is used or the both inverters are used, the heat capacity of the heat sink 19 is roughly equal to the generated heat, which is permitted with respect to the heat capacity of the heat sink 19 and the radiation capacity toward the heat sink 19 and the frame 10, so that the power loss, which is generated when one of the inverters is singly operated, is equal to the power loss, which is generated when the both inverters are concurrently operated. In other words, when the first inverter 27a and the second inverter 27b are concurrently operated, current, of which power loss is equivalent to a power loss at the time of operating one of the inverters, is passed through the both inverters.

When the left member in Formula (1) is changed to "Iw", the following formula (2) is established, and it is understood that "Iw" is equal to "Is/√2".

$$Iw = Is/\sqrt{2} \qquad \text{Formula (2)}$$

Here, because two inverters are provided, all current values are represented by a formula "1/√2×2=2/√2". In other words, current, of which value is √2-times of a current value at a time of using one of the inverters, can be passed, whereby output of the motor can be improved in accordance with the passed current.

Moreover, the thermal-transmission passages extended from the first inverter 27a and the second inverter 27b are roughly parallel to a direction where the axis X of the rotary electric machine 2 extended, and lengths of the passages are short, whereby the radiation capability is improved. Furthermore, because the thermal-transmission passages are roughly parallel to a direction where the axis X of the rotary electric machine 2 is extended, the heat, which is generated by the first inverter 27a and the second inverter 27b and radiated to inside of the driving device 8, is reduced, whereby a temperature rise inside the driving device 8 can be suppressed.

Moreover, the rotary electric machine is configured in such a way that thermal-radiation surfaces of the first inverter 27a and the second inverter 27b and an installation surface of the heat sink 19 are vertical with respect to a direction where the axis X of the rotary electric machine 2 is extended, and the thermal-transmission passages are short, and the thermal-radiation capability is improved. Moreover, the rotary electric machine is configured as described above, so that the heat, which is generated by the first inverter 27a and the second inverter 27b and radiated to inside of the driving device 8, can be reduced.

The first stator winding 5a and the second stator winding 5b, in which two pairs of three-phase windings are wound, are individually connected to the first inverter 27a and the second inverter 27b, and the individual circuits are configured. Therefore, an inter action is not operated between the two inverters, and an imbalance between the two inverters is suppressed, whereby the generated heat is uniformed.

The first motor terminal 9a and the second motor terminal 9b, which respectively correspond to the first stator winding 5a and the second stator winding 5, are arranged at a position where the motor terminals are linearly symmetrical with respect to the extended axis X of the rotary electric machine 2. In other words, a connecting portion for connecting the first stator winding 5a to the first inverter 27a and another connecting portion for connecting the second stator winding 5b to the second inverter 27b are arranged in a state where the connecting portions are linearly symmetrical with respect to a direction where the axis X of the rotary electric machine. Therefore, the first motor terminal 9a and the second motor terminal 9b as well as the first stator winding 5a and the second stator winding 5 are arranged in a state where those are roughly and linearly symmetrical with each other in an electrical condition and a thermal condition, and the heat, which is generated from the first motor terminal 9a and the second motor terminal 9b, and from the first stator winding 5a and the second stator winding 5b, and from the first inverter 27a and the second inverter 27b, is radiated and spread, and then, the imbalance between the two inverters is suppressed, whereby the generated heat is uniformed.

The first smoothing capacitors Ca and the second smoothing capacitors Cb, which absorb ripple current passing through the first stator winding 5a and the second stator winding 5b of the rotary electric machine 2 are installed in the lead frame 28, and the capacitors are connected to the first inverter 27a and the second inverter 27b, which correspond to each other, via terminals (not illustrated). Moreover, the choke coil CL, which absorbs a noise, is also installed in the lead frame 28, and the choke coil CL is connected to a connector (not illustrated) via a terminal (not illustrated). A power connector and a signal connector are provided on the connector.

In the driving-device-coaxial-integral-type rotary electric machine, which is configured as described above, according to Embodiment 1 of the present invention, each pair of three-phase inverters is installed in the heat sink in a state where the inverters are linearly symmetrical with respect to a shaft of the motor, and a heat capacity of the heat sink is roughly equivalent to a volume or a heat capacity of portions corresponding to each of inverters. Moreover, the rotary electric machine is configured in such a way that a thermal-transmission passage for transmitting heat from the inverters to the heat sink is roughly equivalent to a thermal-transmission passage for transmitting heat from the heat sink to the frame, so that the radiation capacities of the inverters are roughly equivalent to etch other, and heat generated from the inverters is radiated and spread, and the imbalance between the two inverters is suppressed, whereby the generated heat is uniformed, whereby a temperature rise inside the driving device 8 can be suppressed. Moreover, driving current is improved, and power of the rotary electric machine 2 is improved, and the device can be downsized.

Moreover, in the driving-device-coaxial-integral-type rotary electric machine according to Embodiment 1 of the present invention, the attachment portion 15 for attaching the reduction mechanism or the like, the rotary electric machine 2, and the driving device 8 are sequentially and integrally configured in the same axis, so that heat generated from the driving device 8 is easily transmitted to the rotary electric machine 2, and thermal radiation capability of the driving device 8 is improved. Moreover driving current is improved, and power of the rotary electric machine 2 is improved, and the device can be downsized.

Embodiment 2

In the driving-device-coaxial-integral-type rotary electric machine according to Embodiment 1, the attachment portion 15, the rotary electric machine 2, and the driving device 8 are sequentially, coaxially, and integrally configured, whereas in a driving-device-coaxial-integral-type rotary electric machine according to Embodiment 2 of the present invention, an attachment portion 15, a driving device 8, and a rotary electric machine 2 are sequentially, coaxially, and integrally configured.

In the driving-device-coaxial-integral-type rotary electric machine according to Embodiment 2, which is configured as described above, heat generated by the driving device 8 is easily transmitted to a reduction mechanism or the like via the attachment portion 15, and a heat capability of the driving device 8 is improved. Moreover, driving current is improved, and power of the rotary electric machine 2 is improved, and the device can be downsized.

Embodiment 3

In a driving-device-coaxial-integral-type rotary electric machine according to Embodiment 3, the driving-device-coaxial-integral-type rotary electric machine according to Embodiment 1 or Embodiment 2 is applied to an electric power steering device. In this case, the rotary electric machine is used as a motor which generates assist torque for the electric power steering device.

In the driving-device-coaxial-integral-type rotary electric machine according to Embodiment 3, power of the rotary electric machine is improved, and the device can be downsized, so that a weight of the electric power steering device can be reduced. Moreover, a weight of a car can be reduced, so that fuel efficiency of the car is improved, and emission of carbon dioxide can be reduced.

In addition, it is possible in the scope of the present invention that each of the embodiments is freely combined, or each of embodiments is suitably modified or omitted.

INDUSTRIAL APPLICABILITY

The driving-device-integral-type rotary electric machine of the present invention can be applied in every field, for example, in a field of an electric power steering system in a car, in which a rotary electric machine is used.

What is claimed is:

1. A driving-device-integral-type rotary electric machine comprising:
    a rotary electric machine, and
    a driving device for driving the rotary electric machine by supplying power, which are integrally fixed; wherein the driving device includes a first inverter and a second inverter, which can supply power to stator windings of the rotary electric machine, and
    the first inverter and the second inverter are installed and arranged in a heat sink, in a state where the inverters are linearly symmetrical with respect to an axis of the rotary electric machine, and
    the heat sink is configured in such a way that heat generated from the first inverter and heat generated from the second inverter is roughly and equivalently spread and radiated,
    wherein a thermal-conductive passage, which is extended from the first inverter through the heat sink, and a thermal-conductive passage, which is extended from the second inverter through the heat sink, are linearly symmetrical with respect to the axis of the rotary electric machine, and the thermal-conductive passages are roughly parallel to a direction where the axis is extended.

2. A driving-device-integral-type rotary electric machine as recited in claim 1, wherein when the first inverter and the second inverter are concurrently operated, the power loss, which is generated when one of the inverters is singly operated, is equal to the power loss, which is generated when both inverters are concurrently operated.

3. A driving-device-integral-type rotary electric machine as recited in claim 2, wherein each value of current applied to the both inverters is $1/\sqrt{2}$-times of a value of current applied to only one of the inverters.

4. A driving-device-integral-type rotary electric machine as recited in claim 1, wherein each of radiation surfaces of the first inverter and the second inverter and a surface of a portion of the heat sink, on which each of the inverters is mounted, are arranged in a vertical direction with respect to a direction where the axis of the rotary electric machine is extended.

5. A driving-device-integral-type rotary electric machine as recited in claim 1, wherein the stator windings are composed of a first stator winding and a second stator winding in a state where the first stator winding is connected to the first inverter, and the second stator winding is connected to the second inverter.

6. A driving-device-integral-type rotary electric machine as recited in claim 1, wherein a connecting portion for connecting the first stator winding to the first inverter and another connecting portion for connecting the second stator winding to the second inverter are arranged in a state where the connecting portions are linearly symmetrical with respect to the axis of the rotary electric machine.

7. A driving-device-integral-type rotary electric machine as recited in claim 1, wherein an attachment portion, which is attached to another mechanism, is further included, and
    the attachment portion, the rotary electric machine, and the driving device are integrally configured in a state where the attachment portion, the rotary electric machine, and the driving device are sequentially arranged.

8. A driving-device-integral-type rotary electric machine as recited in claim 1, wherein the rotary electric machine is a motor which generates assist torque for an electric power steering device.

* * * * *